United States Patent [19]

Ott et al.

[11] Patent Number: 5,380,412
[45] Date of Patent: Jan. 10, 1995

[54] PROCESS FOR COATING ELECTRICALLY CONDUCTING SUBSTRATES, SUBSTRATES COATED BY THIS PROCESS AND AQUEOUS ELECTROCOATING BATHS

[75] Inventors: Günther Ott, Münster; Udo Reiter, Telgte; Walter Jouck, Münster; David J. Santure, Münster; Dieter Rühl, Münster, all of Germany

[73] Assignee: BASF Lacke+Farben AG, Münster, Germany

[21] Appl. No.: 126,669

[22] PCT Filed: Dec. 15, 1988

[86] PCT No.: PCT/EP89/01163
§ 371 Date: Sep. 18, 1990
§ 102(e) Date: Sep. 18, 1990

[87] PCT Pub. No.: WO89/06672
PCT Pub. Date: Jul. 27, 1989

Related U.S. Application Data

[63] Continuation of Ser. No. 548,999, Sep. 18, 1990, abandoned.

[30] Foreign Application Priority Data

Jan. 22, 1988 [DE] Germany .................. 3801786

[51] Int. Cl.⁶ .................................. C25D 13/04
[52] U.S. Cl. ..................... 204/181.7; 204/181.4; 523/415; 523/417; 524/901
[58] Field of Search ............. 204/181.7, 181.4; 523/415, 417; 524/901

[56] References Cited

U.S. PATENT DOCUMENTS

| | | | |
|---|---|---|---|
| 3,236,895 | 2/1966 | Lee et al. | 260/584 |
| 3,975,250 | 8/1976 | Marchetti et al. | 204/181.7 |
| 4,423,166 | 12/1983 | Moriarity et al. | 204/181.7 |
| 4,468,307 | 8/1984 | Wismer et al. | 204/181.7 |
| 4,605,690 | 8/1986 | Debroy et al. | 204/181.7 |
| 4,615,779 | 10/1986 | McCollum et al. | 204/181.7 |
| 4,707,232 | 11/1987 | Batzill et al. | 204/181.7 |
| 4,944,855 | 7/1990 | Schon et al. | 204/181.7 |

OTHER PUBLICATIONS

PCT WO87/05922, published on Oct. 8, 1987 and issued to Schon et al.

Primary Examiner—John Niebling
Assistant Examiner—Kishor Mayekar
Attorney, Agent, or Firm—Kenyon & Kenyon

[57] ABSTRACT

The invention relates to a cathodic electrocoating process, which uses electrocoating baths which contain a cationc amine-modified epoxy resin otainable by reacting
(A) a diepoxy compound of an epoxy equivalent weight below 2000
B) a compound monofunctionally reactive toward the epoxide groups and containign an alcoholic OH group, a phenolic OH group or an SH group, and
(C) an amine, the components (A) and (B) being used in molar ratio of 10:1 to 1:1, preferably 4:1 to 1.5:1 and the positive charges being introduced by protonization of the reaction product and/or by use of amine salts as the component (C). The electrocoating baths used are distinguished by containing at least 7.5% by weight of a polyoxyalkylenepolyamine, the percentage by weight referring to the total amount of binders contained in the electrocoating bath.

13 Claims, No Drawings

PROCESS FOR COATING ELECTRICALLY CONDUCTING SUBSTRATES, SUBSTRATES COATED BY THIS PROCESS AND AQUEOUS ELECTROCOATING BATHS

This is a continuation of application Ser. No. 07/548,999, filed Sep. 18 1990, now abandoned.

The invention relates to a process for coating electrically conducting substrates, in which process (1) the substrate is immersed in an aqueous electrocoating bath which contains a cationic amine-modified epoxy resin obtainable by reacting (A) a diepoxy compound of an epoxide equivalent weight below 2000

(B) a compound monofunctionally reactive toward the epoxide groups and containing an alcoholic OH group, a phenolic OH group or an SH group, and (C) an amine, the components (A) and (B) being used in a molar ratio of 10:1 to 1:1, preferably 4:1 to 1.5:1 and the positive charges being introduced by protonization of the reaction product and/or by use of amine salts as the component (C);

(2) the substrate is connected as cathode, (3) a film is deposited on the substrate by the action of direct current, (4) the substrate is removed from the electrocoating bath and (5) the deposited paint film is baked.

The invention also relates to substrates coated by the process according to the invention and to the electrocoating baths employed in the process according to the invention.

The cathodic electrocoating process described above is a painting process frequently used primarily for priming, in particular for priming automotive bodies.

A process according to the preamble of patent claim 1 is known from DE-OS 3,518,732, DE-OS 3,409,188 and DE-OS 3,518,770.

Surface defects (particularly craters), well-known to a person skilled in the art, disadvantageously occur in the processes described in DE-OS 3,409,188, DE-OS 3,518,732. and DE-OS 3,518,770.

The object forming the basis of the present invention is to make available a novel process according to the preamble of patent claim 1, using which it is possible to produce paint films which, compared with paint films of prior art, exhibit fewer and/or more faintly pronounced surface defects and do not give rise to defects due to adhesion failure in overcoated paint films.

The object is achieved according to the invention by a process according to the preamble of patent claim 1, wherein the electrocoating bath contains at least 7.5% by weight of a polyoxyalkylenepolyamine or a mixture consisting of several polyoxyalkylenepolyamines of different chemical structures, the percentage by weight referring to the total amount of binders contained in the electrocoating bath.

The advantages achieved by the invention are essentially to be found in the fact that it is possible, using the process according to the invention, to obtain paint films which, compared with paint films of prior art, exhibit fewer and/or more faintly pronounced surface defects and do not give rise to defects due to adhesion failure in overcoated paint films, especially in overcoated paint films containing alkyd resins as binders.

Further important advantages achieved by the process according to the invention lie in the fact that, compared with prior art, the paint films obtained by the process according to the invention possess greater film thicknesses and greater flexibility.

U.S. Pat. No. 3,975,250 discloses cationic reactive plasticizers, suitable for use in electrocoating baths, which are prepared by the reaction of partly blocked polyisocyanates with polyoxypropylenediamines. However, an average person skilled in the art, faced with the object forming the basis of the present invention, is unable to infer from U.S. Pat. No. 3,975,250 any information for achieving this object.

U.S. Pat. No. 4,423,166 discloses an electrocoating process, wherein the electrocoating bath contains as anticratering agent an adduct of polyoxyalkylenepolyamine and a polyepoxide. However, the process disclosed in U.S. Pat. No. 4,423,166 does not use electrocoating baths according to the preamble of patent claim 1.

If, however, the anticratering agents disclosed in U.S. Pat. No. 4,423,166 are employed in a process according to the preamble of patent claim 1, then it is true that the tendency for surface defect formation is reduced, but instead problems due to adhesion failure occur in the overcoated paint films. Particularly serious problems occur in overcoated paint films containing alkyd resins as binders.

The advantages achieved by the present invention are the more surprising, since electrocoating baths are described in U.S. Pat. No. 4,423,166, column 18, which contain up to 7.0% by weight of a polyoxyalkylenepolyamine based on the total amount of binders in the electrocoating bath, but produce paint films with pronounced surface defects (cf. Table 1 in U.S. Pat. No. 4,423,166).

Electrocoating baths for cathodic electrocoating are preferably preferred by first preparing an aqueous dispersion which contains a cationic resin and, if appropriate, a crosslinking agent and other customary additives, such as, for example, antifoams etc.

A pigment paste is then incorporated in this aqueous dispersion.

The pigment paste consists of a ground resin and pigments and/or fillers. In addition, the pigment paste may also contain other additives, such as, for example, plasticizers wetting agents, antioxidants etc.

Examples of pigments and fillers which the pigment paste may contain, are: titanium dioxide, antimony oxide, zinc oxide, basic lead carbonate, basic lead sulfate, barium carbonate, porcelain, clay, calcium carbonate, aluminum silicate, silicon dioxide, magnesium carbonate, magnesium silicate, cadmium yellow, cadmium red, carbon black, phthalocyanin blue, chrome yellow, toluidyl red and hydrated iron oxide.

The preparation of the pigment paste is generally known and need not be explained here in greater detail (cf., for example, D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, volume 2, Wiley and Sons, New York (1961).

The pigment paste is added to the aqueous dispersion described above in such an amount that the finished electrocoating bath possesses the characteristics required for the deposition. In most cases the weight ratio of pigments or filler to the total amount of cationic resin contained in the electrocoating bath is 0.05 to 0.5.

After the aqueous dispersion and the pigment paste have been combined and the solids content of the combination has been suitably adjusted, an electrocoating bath ready-for-use is obtained.

The electrocoating baths used according to the invention contain a cationic amine-modified epoxy resin obtainable by reacting (A) a diepoxy compound of an epoxide equivalent weight: below 2000

(B) a compound monofunctionally reactive toward the epoxide groups and containing an alcoholic OH group, a phenolic OH group or an SH group, and (C) an amine, the components (A) and (B) being used in a molar ratio of 10:1 to 1:1, preferably 4:1 to 1.5:1, and the positive charges being introduced by protonization of the reaction product and/or by use of amine salts as the component (C).

Cationic amine-modified epoxy resins of the type described above are disclosed in DE-OS 3,409,188, DE-OS 3,518,732 and DE-OS 3,518,770.

Any compound containing two reactive epoxide groups and having an epoxide equivalent weight below 2000, preferably below 1000, particularly preferably below 500, may in principle be used as the component (A).

Examples of diepoxide compounds which may be employed as the component (A), are diglycidyl ethers of polyphenols, diglycidyl ethers of dialcohols and diglycidyl esters of dicarboxylic acids.

Diglycidyl ethers of polyphenols, in particular diglycidyl ethers of bisphenol A, are particularly preferably used as the component (A). Diglycidyl ethers of polyphenols may be obtained by the reaction of epihalohydrins with polyphenols.

Mixtures of various diepoxide compounds may of course also be employed as the component (A).

Any compound monofunctionally reactive toward epoxide groups, which contains an alcoholic OH group reactive toward epoxide groups, a phenolic OH group reactive toward epoxide groups or an SH group reactive toward epoxide groups in the molecule, may in principle be used as the component (B).

Compounds which contain a phenolic OH group reactive toward epoxide groups in the molecule, in particular alkyl phenols, are particularly preferred as the component (B).

Mixtures of various compounds monofunctionally reactive toward epoxide groups, may of course also be used.

Primary or secondary amines or their salts, salts of tertiary amines or mixtures of these compounds may be used as the component (C).

Water-soluble amines are preferably used as the component (C). Examples of suitable amines are monoalkylamines and dialkylamines, such as methylamine, ethylamine, propylamine, butylamine, dimethylamine, diethylamine, dipropylamine, methylbutylamine etc. Alkanolamines, such as, for example, methylethanolamine and diethanolamine, may also be used as the components (C). Ketimines of polyamines with primary and secondary amino groups may be used as the component (C). In addition, dialkylaminoalkylamines, such as, for example, dimethylaminoethylamine, diethylaminopropylamine and dimethylaminopropylamine are also suitable as the component (C).

Low-molecular amines are employed in most cases as the component (C). However, it is also possible to use high-molecular monoamines.

In many cases several different amines are used as the component (C).

The cationic amine-modified epoxy resin under discussion may be produced by preparing from the components (A) and (B) in a first step an intermediate containing epoxide groups having a molecular weight of 400 to 5000. This reaction is preferably carried out in an inert organic solvent at reaction temperatures from 100° to 190° C. in the presence of suitable catalysts (for example tertiary amines) and is controlled by determinations of the epoxide equivalent weights.

The epoxide groups of the intermediate obtained in this manner are then reacted at least in part with the component (C). In those cases where no amine salts are used as the-component (C), this reaction is likewise carried out preferably in an organic solvent. The reaction between amines and compounds containing epoxide groups frequently sets in already when the two coreactants are mixed. Depending on the desired course of reaction, particularly for the reaction to go to completion, it is advisable to raise the reaction temperature to 50°–150° C. When amine salts are used as the component (C), then it is preferable to carry out the corresponding reaction in an aqueous reaction medium.

It is frequently desirable chemically to modify the binder still further. For this purpose at least a part of the reactive groups of the intermediate obtained from the components (A) and (B) or of the reaction product obtained from the components (A), (B) and (C) is reacted with modifying compounds.

Examples of modifying compounds are:

a) Compounds containing carboxyl groups, such as saturated or unsaturated monocarboxylic acids (for example benzoic acid, linseed oil fatty acids, 2-ethylhexanoic acid, versatic acid), aliphatic, cycloaliphatic and/or aromatic dicarboxylic acids of various chain lengths (for example adipic acid, sebacic acid, isophthalic acid or dimeric fatty acids), hydroxyalkylcarboxylic acids (for example lactic acid, dimethylolpropionic acid) as well as esters containing carboxyl groups, or b) compounds containing amino groups, such as diethylamine or ethylhexylamine or diamines with secondary amino groups, for example N,N'-dialkylalkylenediamines, such as dimethylethylenediamine, N,N'-dialkylpoloxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethylpolyoxy propylenediamine, polyaminoamides, such as, for example, versamides, particularly reaction products containing terminal amino groups, obtained from diamines (for example hexamethylenediamine), polycarboxylic acids, particularly dimeric fatty acids and monocarboxylic acids, particularly fatty acids, or the product obtained by reacting one mol of diaminohexane with two mol of monoglycidyl ethers or monoglycidyl esters, particularly glycidyl esters of α-branched fatty acids, such as versatic acid, or c) compounds containing hydroxyl groups, such as neopentyl glycol, bis-ethoxylated neopentyl glycol, neopentyl glycol hydroxypivalate, dimethylhydantoin-N,N'-diethanol, hexane-1,6-diol, hexane-2,5-diol, 1,4-bis(hydroxymethyl)cyclohexane, 1,1-isopropylidene-bis-(p-phenoxy)-2-propanol, trimethylolpropane, pentaerythritol or aminoalcohols, such as triethanolamine, methyldiethanolamine or alkylketimines containing hydroxyl groups, such as aminomethylpropanediol-1,3-methylisobutylketimine or tris(hydroxymethyl)aminomethanecyclohexanoneketimine as well as polyglycol ethers, polyester polyols, polyether polyols, polycaprolactone polyols, polycaprolactam polyols of various functionality and molecular weights, or d) saturated or unsaturated fatty acid methyl esters which in the presence of sodium methylate are esterified by the hydroxyl groups of the epoxy resins.

The positive charges required for the water thinnability and the capability to be electrically deposited may be introduced in the binder molecule by protonization with water-soluble acids (for example boric acid, formic acid, lactic acid, preferably acetic acid) and/or by the use of amine salts as the components (C).

The cationic amine-modified epoxy resins used according to the invention are essentially free from epoxide groups, i.e. their epoxide group content is so low that no cross-linking reactions via the epoxide groups can occur either prior to or after the deposition of the paint films. The cationic amine-modified epoxy resins used according to the invention preferably contain no free epoxide groups.

The cationic amine-modified epoxy resin used in the electrocoating baths according to the invention may be converted by chemical modification to a self-crosslinking cationic resin. A self-crosslinking cationic resin may be obtained by reacting the cationic amine-modified resin or a precursor of the cationic amine-modified epoxy resin with partly blocked polyisocyanate containing on average one free isocyanate group per molecule. However, the electrocoating baths preferably used in the process according to the invention are those which contain the cationic amine-modified epoxy resin under dicussion as a non-self-crosslinking cationic resin in combination with a suitable crosslinking agent.

Examples of suitable crosslinking agents are phenoplasts, polyfunctional Mannich bases, melamine resins, benzoguanamine resins, blocked polyisocyanates and compounds containing at least two groups of the general formula $R^1$—O—CO—.

The radical $R^1$ denotes $R^2$—O—CO—CH$_2$—, $R^3$—CHOH—CH$_2$— or $R^4$—CHOR$^5$—CHOH—CH$_2$—
$R^2$ denotes alkyl
$R^3$ denotes H, alkyl, $R^6$—O—CH$_2$— or $R^6$—CO—O—CH$_2$—
$R^4$ denotes H or alkyl
$R^5$ denotes H, alkyl or aryl
$R^6$ denotes alkyl, cycloalkyl or aryl Examples of compounds containing at least two groups of the general formula $R^1$—O—CO—, are bis(carbalkoxymethyl) azelate, bis(carbalkoxymethyl) sebacate, bis(carbalkoxymethyl) adipate, bis(carbalkoxymethyl) decanoate, bis(carbalkoxymethyl) terephthalate, bis(2-hydroxybutyl) azcelate and bis(2-hydroxyethyl) terephthalate.

The electrocoating baths particularly preferably used in the process according to the invention are those which contain the cationic amine-modified epoxy resin under discussion as a non-self-crosslinking cationic resin in combination with a blocked polyisocyanate as crosslinking agent.

Any polyisocyanate in which the isocyanate groups have been reacted with a compound in such a manner that the blocked polyisocyanate formed is non-reactive toward hydroxyl and amino groups at room temperature, but becomes reactive at elevated temperatures, usually in the range from about 90° C. to about 300° C., may be used as the blocked polyisocyanate. Any organic polyisocyanate suitable for the crosslinking may be employed in the preparation of the blocked polyisocyanates. Isocyanates containing about 3 to 36, particularly about 8 to about 15 carbon atoms, are preferred. Examples of suitable diisocyanates are hexamethylene diisocyanate, 2,4-toluylene diisocyanate, 2,6-toluylene diisocyanate and 1-isocyanatomethyl-5-isocyanato-1,3,3-trimethylcyclohexane. Polyisocyanates of higher isocyanate functionality may also be used. Corresponding examples are trimerized hexamethylene diisocyanate and trimerized isophorone diisocyanate. In addition, mixtures of polyisocyanates may be also used. The organic polyisocyanates which are suitable crosslinking agents in the invention, may also be prepolymers derived, for example, from a polyol including a polyether polyol or a polyester polyol.

Any suitable aliphatic, cycloaliphatic or aromatic alkylmonoalcohol may be used for the blocking of the polyisocyanates. Examples are aliphatic alcohols such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols such as cyclopentanol and cyclohexanol, aromatic alkylalcohols such as phenylcarbinol and methylphenylcarbinol.

Other suitable blocking agents are hydroxylamines such as ethanolamine, oximes such as methyl ethyl ketonoxime, acetonoxime and cyclohexanonoxime, or amines such as dibutylamine and diisopropylamine. These polyisocyanates and blocking agents may be also used in suitable proportions for the preparation of the partly blocked polyisocyanates referred to above.

The crosslinking agent is usually added in an amount of 5 to 60% by weight, preferably 20 to 40% by weight, based on the total amount of crosslinkable cationic resin contained in the electrocoating bath.

The proportion of the cationic amine-modified epoxy resin described in the preamble of patent claim 1, of the total amount of binders contained in the electrocoating bath is preferably 90 to 40, particularly preferably 75 to 60% by weight in those cases in which the cationic amine-modified epoxy resin is present as a non-self-crosslinking resin, and is preferably 100 to 70% by weight in those cases in which the cationic amine-modified epoxy resin is present as a self-crosslinking resin.

It is an essential part of the invention that the electrocoating baths used in the process according to the invention contain at least 7.5 % by weight of a polyoxyalkytene polyamine, the percentage by weight referring to the total amount of binders contained in the electrocoating bath.

Polyoxyalkylenepolyamines are understood to be compounds which contain oxyalkylene groups as well as at least two amino groups, preferably at least two primary amino groups. The polyoxyalkylenepolyamines should have a number average molecular weight of about 137 to 3600, preferably 400 to 3000, particularly preferably 800 to 2500. In addition, the polyoxyalkylenepolyamines should have an amine equivalent weight of about 69 to about 1800, preferably 200 to 1500, particularly preferably 400 to 1250.

The polyoxyalkylenepolyamines used preferably have a chemical structure according to the general formula (I)

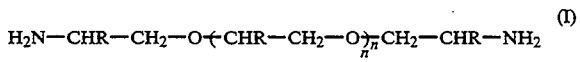

$$H_2N-CHR-CH_2-O-(CHR-CH_2-O)_n-CH_2-CHR-NH_2 \quad (I)$$

in which

R denotes H or an alkyl radical of 1 to 6 carbon atoms, preferably —$CH_3$ n denotes 5–60, preferably 20–40

The polyoxyalkylenepolyamines which possess a chemical structure according to the general formula (I), are disclosed in U.S. Pat. No. 3,236,895, column 2, lines 40–72. The methods for the preparation of these polyoxyalkylenepolyamines are disclosed in columns 4 to 9 of U.S. Pat. No. 3,236,895 in patent examples 4, 5, 6 and 8 to 12.

It is also possible to use polyoxyalkylenepolyamines which contain different oxyalkylene groups, for example polyoxyalkylenepolyamines which possess a chemical structure according to the general formula (II):

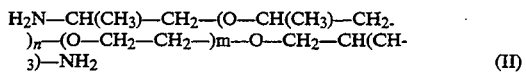

$$H_2N-CH(CH_3)-CH_2-(O-CH(CH_3)-CH_2-)_n-(O-CH_2-CH_2-)_m-O-CH_2-CH(CH_3)-NH_2 \quad (II)$$

in which n+m denotes 5 to 60, preferably 20 to 40 m denotes 1 to 59, preferably 5 to 30 n denotes 1 to 59, preferably 5 to 30

It is also possible to use polyoxyalkylenepolyamine derivatives which are obtainable by the reaction of the polyoxyalkylenepolyamines described in U.S. Pat. No. 3,236,895, column 2, lines 40–72, with acrylonitrile, with a subsegment hydrogenation of the reaction product. These derivatives possess a chemical structure according to the general structural formula (III):

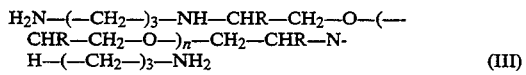

$$H_2N-(-CH_2-)_3-NH-CHR-CH_2-O-(-CHR-CH_2-O-)_n-CH_2-CHR-NH-(-CH_2-)_3-NH_2 \quad (III)$$

in which

R denotes H or an alkyl radical of 1 to 6 carbon atoms, preferably —$CH_3$ n denotes 5 to 60, preferably 20 to 40

The electrocoating baths used according to the invention may of course also contain a mixture of several polyoxyalkylenepolyamines of different chemical structures.

The polyoxyalkylenepolyamines or mixtures of polyoxyalkylenepolyamines may be incorporated in the electrocoating baths at any time during the preparation of the electrocoating baths as well as after these are finished. The polyoxyalkylenepolyamines or the polyoxyalkylenepolyamine mixtures are preferably added either to the aqueous dispersion or to a precursor of the aqueous dispersion which contains the cationic amine-modified epoxy resin described in the preamble of patent claim 1 and, optionally, crosslinking agents and other customary additives (cf. p. 5, lines 1 to 5), or to the pigment paste or a precursor of the pigment paste (cf. p. 5, lines 8 to 19). The polyoxyalkylenepolyamine molecules are very probably protonized by the acid contained in the aqueous dispersion or the pigment paste.

However, it is also possible to add the corresponding-polyoxyalkylenepolyamine or polyoxyalkylenepolyamine mixture in protonized form to the aqueous dispersion under discussion or to a precursor of this dispersion or to the pigment paste or to a precursor of the pigment paste. The protonized polyoxyalkylenepolyamine or polyoxyalkylenepolyamine mixture may be obtained by asimple addition of a Brönsted acid to the correspondingpolyoxyalkylenepolyamine or polyoxyalkylenepolyamine mixture. The total amount of Brönsted acid contained in the finished electrocoating bath should be chosen such that the pH of the electrocoating bath is between 4 and 8, preferably between 5 and 7.5.

It is an essential part of the invention that the amount of polyoxyalkylenepolyamine or polyoxyalkylenepolyamine mixture contained in the electrocoating baths used according to the invention is at least 7.5% by weight, the percentage by weight referring to the total amount of binders contained in the electrocoating bath. In other words this means that the electrocoating baths used according to the invention must contain at Least 7.5 parts by weight of polyoxyalkylenepolyamine or polyoxyakylenepolyamine mixture per 100 parts by weightof binder. If electrocoating baths of a lower content ofpolyoxy-alkylenepolyamine or polyoxyalkylenepolyamine mixture are employed, paint films are obtained with a considerably greater number of, and/or considerably more strongly pronounced, surface defects than if electrocoating baths according to the invention are used.

The upper limits of the amounts of polyoxyalkylenepolyamine or polyoxyalkylenepolyamine mixture contained in the electrocoating baths used according to the invention are determined by the plasticizing effect of the added polyoxyalkylenepolyamine or polyoxyalkylenepolyamine mixture and generally is from 20 to 40% by weight, the percentage by weight referring to the total amount of binders contained in the electrocoating bath.

The electrocoating baths used according to the invention preferably contain 8 to 18, particularly preferably 10 to 15% by weight of polyoxyalkylenepolyamine or polyoxyalkylenepolyamine mixture, the percentage by weight referring to the total amount of binders contained in the electrocoating bath.

The total amount of binders contained in the electrocoating bath is obtained by adding the amount of cationic amine-modified epoxy resin of the type described in the preamble of patent claim 1 and contained in the electrocoating bath, the amount of crosslinking agents optionally contained in the electrocoating bath, the amount of ground resin contained in the electrocoating bath and the amount of resins which crosslink under the conditions of baking and which may or may not be additionally present in the electrocoating bath.

The solids content of the electrocoating bath used according to the invention is preferably 7 to 35 parts by weight, particularly preferably 12 to 25 parts by weight.

The electrocoating bath is brought into contact with an electrically conducting anode and with an electrically conducting substrate connected as cathode. When electric current passes between the anode and the cathode, a strongly adhering paint film is deposited on the cathode.

The temperature of the electrocoating bath should be between 15° to 35° C., preferably between 20° to 30° C.

The applied voltage may fluctuate within a considerable range and may be, for example, between 2 and 1000 volt.

Typical operating voltages are, however, between 50 and 500 volt. Current density is usually between about 10 and 100 ampere/m². Current density tends to drop in the course of the deposition.

After deposition the coated object is rinsed and is ready for baking.

The deposited paint films are generally baked at temperatures from 130° to 200° C. over a period from 10 to 60 minutes, preferably at 150° to 180° C. over a period from 15 to 30 minutes.

The process according to the invention may be employed for coating any electrically conducting substrate, but particularly for coating metals such as steel, aluminum, copper and the like.

The invention is explained in greater detail in the examples below. All parts and percentages are parts and percentages by weight unless expressly stated otherwise.

1. Preparation of aqueous dispersions containing the cationic amine-modified epoxy resin according to the preamble of patent claim 1 and a crosslinking agent 1.1 Preparation of the amine-modified epoxy resin 1780 g of Epikote 1001[1]), 280 g of dodecylphenol and 105 g of xylene are placed in a reaction vessel and melted at 120° C. in an atmosphere of nitrogen. Traces of water are then removed by distillation under a slight vacuum. 3 g of N,N'-dimethylbenzylamine are then added, the reaction mixture is heated to 130° C. and this temperature is kept for about 3 h, until the epoxide equivalent weight (EEW) has risen to 1162. The reaction mixture is then cooled and 131 g of hexylglycol, 131 g of diethanolamine and 241 g of xylene are added in rapid succession. This produces a slight temperature rise. The reaction mixture is then cooled to 90° C. and is further diluted by the addition of 183 g of butylglycol and 293 g of isobutanol. When the temperature has dropped to 70° C., 41 g of N,N'-dimethylaminopropylamine are added, this temperature is kept for 3 h and the mixture is discharged.

[1]) Epoxy resin from Shell of an epoxide equivalent weight of 500.

The resin has a solids content of 70.2 % and a base content of 0.97 milliequivalents/gram.

1.2 Preparation of a crosslinking agent 1.129 g of toluylene diisocyanate (commercial mixture of the 2,4- and 2,6-isomers) and 490 g of methyl isobutyl ketone are placed in a reaction vessel in an atmosphere of nitrogen. 0.6 g of dibutylzinc dilaurate is then added in small portions with 290 g of trimethylolpropane with stirring at such a rate that with external cooling the internal temperature does not exceed 50° C. (duration about 2 h). Stirring is continued with cooling until the NCO equivalent has reached the value of 215. 675 g of ethylene glycol monopropyl ether are then added dropwise at such a rate that the internal temperature does not exceed 100° C. The temperature is maintained at 100° C. for a further 1 hour, the reaction mixture is diluted with 362 g of methyl isobutyl ketone and 10 g of n-butanol and is then discharged after a brief cooling period. The resin has a solids content of 71.8 % (1 h at 130° C.) and a viscosity of 1.5 dPas (50 % solution in methyl isobutyl ketone, measured in a plate-cone viscometer).

1.3 Preparation of the aqueous dispersion 1.3.1 Dispersion (I)

915 g of the resin from procedure 1.1, 493 g of the crosslinking agent from procedure 1.2 and 134 g of a polyoxypropylenediamine having the formula

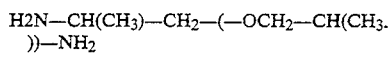

H2N—CH(CH3)—CH2—(—OCH2—CH(CH3-))—NH2 denotes 33.1 (Jeffamine ®D 2000, commercial product from Texaco Chemical Company) are mixed at room temperature and stirred. As soon as the solution has become homogeneous, 2.2 g of an antifoam solution[1]) and 22 g of glacial acetic acid are added with stirring, followed by 674 g of deionized water added in 6 portions. The reaction mixture is then diluted with a further 960 g of deionized water added in small portions.

[1]) Surfynol (commercial product from Air Chemicals), 50% solution in ethylene glycol monobutyl ether The resultant aqueous dispersion is freed from low-boiling solvents by a vacuum distillation and subsequently diluted with deionized water to a solids content of 33%.

1.3.2 Dispersion (II)

The procedure 1.3.1 is followed except that 67 g of polyoxyalkylenepolyamines are used instead of 134 g of polyoxyalkylenepolyamines.

1.3.3 Dispersion (III)

The procedure of 1.3.1 is followed, except that no polyoxyalkylenepolyamine is added. In order to adjust the solids content to 33%, less deionized water is added after the vacuum distillation.

2. Preparation of a pigment paste 2.1 Preparation of a ground resin in accordance with DE-OS 3,422,457

640 parts of a diglycidyl ether based on bisphenol A and epichlorohydrin of an epoxide equivalent weight of 485 and 160 parts of the same type of diglycidyl ether of an epoxide equivalent weight of 189 are mixed at 100° C. 452 parts of hexamethylenediamine are placed in a second vessel, heated to 100° C. and treated with 720 parts of the above hot epoxy resin mixture in the course of one hour with slight cooling in order to keep the temperature at 100° C. After a further 30 minutes the excess hexamethylendiamine is distilled off at elevated temperature and reduced pressure, a final temperature of 205° C. and final pressure of 30 mbar being reached. 57.6 parts of stearic acid, 172.7 parts of dimeric fatty acid and 115 parts of xylene are then added. The water formed is then removed by azeotropic distillation at 175 to 180° C. over 90 minutes. 58 parts of butylglycol and 322 parts of isobutanol are then added added. The product has a solids content of 70% and a viscosity of 2240 mPas, measured at 75° C. in a plate-cone viscometer.

2.2 Preparation of the pigment paste 586 parts of the ground resin are intensively mixed with 1162 parts of deionized water and 22 parts of glacial acetic acid. 880 parts of TiO2, 250 parts of an extender based on aluminum silicate, 53 parts of lead silicate and 10 parts of carbon black are then added. This mixture is comminuted in a grinding aggregate to a Hegman fineness of less than 12 μm. Deionized water is then added in order to attain the desired paste consistency.

3. Preparation of the electrocoating baths and depositions according to the invention 700 parts of the pigment paste from procedure 2.2 are added to 2200 parts by weight of the dispersion from procedure 1.3, and the solids content of the bath is adjusted to 20% by weight with deionized water. The paint film deposition is carried out during 2 minutes at 300 V onto a phosphated steel panel. The temperature of the bath is 27° C. The films are baked at 165° C. for 20 minutes.

Electrocoating bath 1: Dispersion from procedure 1.3.1 with paste from procedure 2.2
 Polyoxypropylenediamine content (based on the total amount of binder): 11.9% by weight Electrocoating bath 2: Dispersion from procedure 1.3.2 with paste from procedure 2.2
 Polyoxypropylenediamine content (based on the total amount of binders): 6.0% by weight Electrocoating bath 3: Dispersion from procedure 1.3.3 with paste from procedure 2.2 Polyoxypropylenediamine content: 0% by weight

|  | Deposition results | | |
| --- | --- | --- | --- |
| Electroplating bath | 1 | 2 | 3 |
| Film thickness (μm) | 27 | 20 | 16 |
| Flow-out[1] | 1.5 | 2.5 | 1.5 |
| Craters/dm$^2$ | 1 | 20 | 10 |

These films were then overcoated by a commercial aqueous filler and a white alkyd topcoat and submitted to a condensed water-constant climate test for 240 h. The adhesion of the films was subsequently tested by the cross-hatch and Tesa pull-off tests.

| Electrocoating bath | 1 | 2 | 3 |
| --- | --- | --- | --- |
| Adhesion[1] | 0.5 | 0.5 | 0.5 |

[1]Rating 0 to 5 (good - poor)

We claim:

1. A process for coating electrically conducting substrates, comprising the steps of:
 (1) immersing the substrate in an aqueous electrocoating bath which contains a cationic amine-modified epoxy resin obtained by reacting
  (A) a diepoxy compound of an epoxide equivalent weight below 2000,
  (B) a compound monofunctionally reactive toward epoxide groups and containing an alcoholic OH group, a phenolic OH group or an SH group, and
  (C) an amine,
 the components (A) and (B) being used in molar ratio of 10:1 to 1:1 and the positive charges being introduced by protonization of the reaction product, by use of an amine salt as component (C) or a combination thereof;
 (2) connecting the substrate to a current source to act as a cathode,
 (3) depositing a film on the substrate by the action of direct current,
 (4) removing the substrate from the electrocoating bath and
 (5) baking the deposited paint film, wherein the electrocoating bath further contains at least 7.5% by weight of a polyoxyalkylenepolyamine, wherein the polyoxyalkylenepolyamine is selected from the group consisting of chemical structures having the formula:

$$H_2N-CHR_1-CH_2-O-)_n-CH_2-CHR_1-NH_2$$

in which $R_1$ denotes H or an alkyl radical or 1 to 6 carbon atoms, and n denotes 5–60,

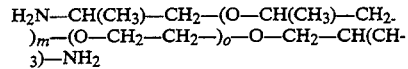

in which m+o denotes 5 to 60, m denotes 1 to 59, and o denotes 1 to 59, and

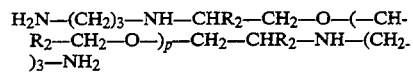

in which $R_2$ denotes H or an alkyl radical of 1 to 6 carbon atoms, and p denotes 5 to 60, the percentage by weight referring to the total amount of binder contained in the electrocoating bath.

2. The process as claimed in claim 1, wherein the electrocoating bath further contains a blocked polyisocyanate as crosslinking agent.

3. The process as claimed in claims 1 or 2, wherein the polyoxyalkylenepolyamine is

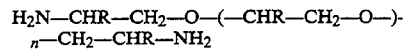

in which R denotes H or an alkyl radical of 1 to 6 carbon atoms, n denotes 5 to 60.

4. An aqueous electrocoating bath comprising: a cationic amine-modified epoxy resin obtainable by reacting
 (A) a diepoxy compound of an epoxide equivalent weight below 2000,
 (B) a compound monofunctionally reactive toward epoxide groups and containing an alcoholic OH group, a phenolic OH group or an SH group, and
 (C) an amine,
 the components (A) and (B) being used in a molar ratio of 10:1 to 1:1 and positive charges being introduced by protonization of the reaction product or use of an amine salt as the component (C), wherein the electrocoating contains at least 7.5% by weight of a polyoxyalkylenepolyamine,
 wherein the polyoxyalkylenepolyamine is selected from the group consisting of chemical structures having the formula:

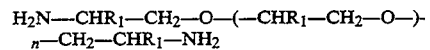

in which $R_1$ denotes H or an alkyl radical of 1 to 6 carbon atoms, and n denotes 5–60,

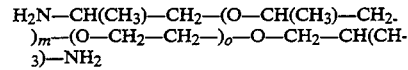

in which m+o denotes 5 to 60, m denotes 1 to 59, and o denotes 1 to 59, and

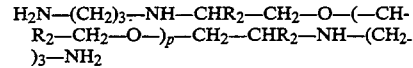

in which $R_2$ denotes H or an alkyl radical of 1 to 6 carbon atoms, and p denotes 5 to 60, the percentage by weight referring to the total amount of binder contained in the electrocoating bath.

5. An electrocoating bath as claimed in claim 4, further comprising a crosslinking agent, the agent being a blocked polyisocyanate.

6. An electrocoating bath as described in claim 4 or 5 wherein the polyoxyalkylenepolyamine is $$H_2N-CHR-CH_2-O-(CHR-CH_2-O-)_n-CH_2-CHR-NH_2$$

in which R denotes H or an alkyl radical of 1 to 6 carbon atoms, and n denotes 5 to 60.

7. The process of claim 1 wherein the components (A) and (B) are used in a molar ratio of 4:1 to 1.5:1.

8. The process of claim 3 wherein R is —$CH_3$.

9. The process of claim 3 wherein n denotes 20 to 40.

10. The electrocoating bath of claim 6 wherein R is —$CH_3$.

11. The electrocoating bath of claim 6 wherein n denotes 20 to 40.

12. A process for electrocoating a substrate in an electrocoating bath, comprising cathodically electrodepositing onto said substrate a cationic amine-modified epoxy resin comprised of the reaction product of (A) a diepoxy compound having an epoxide equivalent weight below 2000; (B) a compound monofunctionally reactive toward the epoxide group of (A) and containing an alcoholic —OH group, a phenolic —OH group or an —SH group and (C) an amine, the components (A) and (B) being used in a molar ratio of 10:1 to f1:1, said reaction product being positively charged by protonization of the reaction product, said electrocoating bath further containing at least 7.5% by weight of a polyoxyalkylenepolyamine, wherein the polyoxyalkylenepolyamine is selected from the group consisting of chemical structures having the formula:

$$H_2N-CHR_1-CH_2-O-(-CHR_1-CH_2-O-)_n-CH_2-CH_2-CHR_1-NH_2$$

in which $R_1$ denotes H or an alkyl radical of 1 to 6 carbon atoms, and n denotes 5–60, $$H_2M-CH(CH_3)-CH_2-(O-CH(CH_3)-CH_2-)_m-(O-CH_2-CH_2-)_o-O-CH_2-CH(CH_3)-NH_2$$

in which m+o denotes 5 to 60, m denotes 1 to 59, and o denotes 1 to 59, and $$H_2N-(CH_2)_3-NH-CHR_2-CH_2-O-(-CHR_2-CH_2-O-)_p-CH_2-CHR_2-NH-(CH_2)_3-NH_2$$

in which $R_2$ denotes H or an alkyl radical of 1 to 6 carbon atoms, and p denotes 5 to 60, based upon the total weight of the binders contained in the bath.

13. A process for electrocoating a substrate in an electrocoating bath comprising cathodically electrodepositing onto said substrate a cationic amine-modified epoxy resin comprised of the reaction product (A) a diepoxy compound having an epoxide equivalent weight below 2000; (B) a compound monofunctionally reactive toward the epoxides of (A) and containing an alcoholic —OH group, a phenolic —OH group or an —SH group and (C) an amine, the components (A) and (B) being used in a molar ratio of 10:1 to 1:1, and the positively charges being introduced by protonization of the reaction product or use of an amine salt as the component (C) said bath further containing at least 7.5% by weight of a polyoxyalkylenepolyamine, wherein the polyoxyalkylenepolyamine is selected from the group consisting of chemical structures having the formula:

$$H_2N-CHR_1-CH_2-O-(-CHR_1-CH_2-O-)_n-CH_2-CHR_1-NH_2$$

in which $R_1$ denotes H or an alkyl radical of 1 to 6 carbon atoms, and n denotes 5–60, $$H_2M-CH(CH_3)-CH_2-(O-CH(CH_3)-CH_2-)_m-(O-CH_2-CH_2-)_o-O-CH_2-CH(CH_3)-NH_2$$

in which m+o denotes 5 to 60, m denotes 1 to 59, and o denotes 1 to 59, and $$H_2N-(CH_2)_3-NH-CHR_2-CH_2-O-(-CHR_2-CH_2-O-)_p-CH_2-CHR_2-NH-(CH_2)_3-NH_2$$

in which $R_2$ denotes H or an alkyl radical of 1 to 6 carbon atoms, and p denotes 5 to 60, based upon the total weight of the binders contained in the bath.

* * * * *